United States Patent [19]

Yoshida et al.

[11] Patent Number: 5,930,229
[45] Date of Patent: Jul. 27, 1999

[54] INTERFERENCE CANCELLER FOR CDMA

[75] Inventors: Shousei Yoshida; Akihisa Ushirokawa, both of tokyo, Japan

[73] Assignee: NEC Corporation, Tokyo, Japan

[21] Appl. No.: 08/814,428

[22] Filed: Mar. 10, 1997

[30] Foreign Application Priority Data

May 30, 1996 [JP] Japan ..................................... 8-137032

[51] Int. Cl.⁶ ............................ H04B 7/216; H04J 13/02
[52] U.S. Cl. ......................... 370/203; 370/342; 375/346; 455/63
[58] Field of Search ................................... 370/203, 208, 370/286, 290, 291, 292, 342, 441, 335, 516; 375/200, 206, 207, 316, 324, 326, 343, 346, 350; 455/500, 501, 63, 296, 307

[56] References Cited

U.S. PATENT DOCUMENTS

| | | | |
|---|---|---|---|
| 5,163,044 | 11/1992 | Golden ..................................... | 370/286 |
| 5,550,811 | 8/1996 | Kaku et al. .............................. | 370/342 |
| 5,687,162 | 11/1997 | Yoshida et al. ......................... | 370/203 |
| 5,694,388 | 12/1997 | Sawahashi et al. ...................... | 370/206 |
| 5,734,647 | 3/1998 | Yoshida et al. ......................... | 370/335 |

FOREIGN PATENT DOCUMENTS 7-30519   1/1995   Japan .
8-163087  6/1996   Japan .

OTHER PUBLICATIONS

Yoshida, et al., IEICE Transaction on Communications, "DS/CDMA Adaptive Interference Canceller on Differential Detection for Fast Fading Channel", vol. J77–B11, No. 11, Nov. 1994, pp. 618–627.

*Primary Examiner*—Chi H. Pham
*Assistant Examiner*—Rickey Ngo
*Attorney, Agent, or Firm*—Scully, Scott Murphy & Presser

[57] ABSTRACT

A code-orthogonalizing filter 101 performs inverse spread using an orthogonalizing coefficient, which is obtained through a constraint condition process on a code multiplexed received signal as an input with a desired spread code waveform and independent on transmission line variations, thus detecting a desired wave at a constant power level while suppressing interference waves. A carrier tracking circuit 102 effects carrier phase synchronization of the detected desired wave. A symbol decision unit 104 decides the output of the carrier tracking circuit 102 to be the most certain symbol. An adder 104 extracts as symbol decision error signal from the outputs of the symbol decision unit 103 and the carrier tracking circuit 102. A tap coefficient control means 105 adaptively updates the tap coefficient according to the input to the code-orthogonalizing filter 101, a reproduced carrier outputted from the carrier tracking circuit 102, a symbol decision error signal outputted from the adder 104 and the desired wave spread code waveform.

4 Claims, 5 Drawing Sheets

INTERFERENCE CANCELLER FOR CDMA

BACKGROUND OF INVENTION

The present invention relates to an interference canceller used for code division multiple access (CDMA) systems.

CDMA systems which are based on direct-sequence spreading, are usually capable of greatly expanding the subscriber's capacity, and are thus attracting attention as the multiplex access system for mobile communication systems. In the CDMA system, each user's signal is spread with a unique spreading code in a wide frequency bandwidth and sent to a transmission channel. In the receiver side, a desired user's signal is detected from the code multiplexed received signal through despreading process. In this system, a correlation among user's spreading codes, would cause an interference and degrade the receiver performance. To remove the interference, a practical interference canceller, which performs despreading using an adaptively determined orthogonal coefficients, has been proposed. A literature concerning this interference canceller is Yoshida, Ushirokawa, Yanagi, and Furuya, "DS/CDMA Adaptive Interference Canceller on Differential Detection for Fast Fading Channel",IEICE Transactions on Communications, Vol. J77-B11, No. 11, November 1994 (Japanese Patent Application Heisei 5-169092, and Japanese Patent Publication Heisei 6-307275).

FIG. 5 shows an example of the prior art CDMA interference canceller shown in the literature.

A code-orthogonalizing filter 201 despreads a code-multiplexed received signal using an orthogonal coefficient, which are independent of channel variations, and it thus detects a desired user's signal while suppressing interferences from other users. The orthogonalizing filter 201 is constructed as a transversal filter, and its tap interval is suitably designed to be a fractionally chip-spaced from the consideration of asynchronous interferences. This despreading is different from the despreading using the conventional matched filter in that the orthogonalizing filter 201 uses an adaptively determined orthogonal coefficients as the filter coefficients in lieu of using a spreading code used in the transmitter. A carrier tracking circuit 202 effects carrier phase synchronization of the despread desired user's signal. A symbol decision unit 203 decides the most possible transmitted symbol from the output of the carrier tracking circuit 202. By the term "symbol" is meant the transmitted modulation signal, and in the case of binary phase modulation, for instance, it is "1" or "−1". In this case, the symbol decision unit 203 outputs "1" when the carrier tracking circuit output (analog value) is positive and "−1" when the carrier tracking circuit output is negative. Where multi-level amplitude and phase modulation is used, the decision region becomes two-dimensional (a complex plane). An adder 204 extracts a symbol decision error signal. A tap coefficient updating means 205 updates the orthogonal coefficients recursively on the basis of the symbol decision error signal outputted from the adder 204.

The tap coefficient updating means 205 receives, as its inputs, the input to the orthogonalizing filter 201, a recovery carrier outputted from the carrier tracking circuit 202 and the symbol decision error signal, and determines the orthogonal coefficients such that the mean power of the symbol decision error signal is minimum. This control is called minimum mean square error (MMSE) control. A least mean square (LMS) algorithm is well known as a method for easily realizing the MMSE control. An example of operation of the tap coefficients updating means 205 when the LSM algorithm is used is as follows.

The tap coefficients vector c(i+1) is expressed as:

$$c(i+1)=c(i)+Re[\mu r^*(i)x(i)e(i)]$$

and the symbol decision error signal e(i) is expressed as:

$$e(i)=d(i)-c^T(i)r(i)x^*(i)$$

where r(i) is an input signal vector to the orthogonalizing filter 201, x(i) is the recovery carrier outputted from the carrier tracking circuit 202, d(i) is a decision symbol outputted from the symbol decision unit 203, * is the complex conjugate, $^T$ is the matrix transpose, Re[·] is the process for taking the real part, and $\mu$ is the step size.

As shown, in the prior art CDMA interference canceller, the tap coefficients are recursively updated according to the symbol decision error signal, and the interference cancellation can be performed adaptively and easily according to changes in the spreading timing and power of interference signal. In the initial converging of the tap coefficients, however, the decision symbol usually lacks reliability, and training signal is needed in place of the decision symbol. As the training signal, a symbol pattern which is known to the receiver side is transmitted from the transmitter side.

In the prior art CDMA interference canceller as described above, in which the training signal is required at the time of the initial convergence, the tap number of the orthogonalizing filter 201 is set to a few times the number of the spreading code length. Therefore, for the convergence, the training signal of several ten times the tap number is necessary. The data transmission efficiency is therefore extremely reduced particularly for the burst data transmission. In addition, it requires a process including operations that the interference canceller detects the establishment of the convergence and transmits the detection signal to the transmitter and that the transmitter switches training signal over to the information data signal. A further problem is that when the orthogonalizing filter 201 gets into the loss of the synchronization, detection of the synchronization loss and re-sending of training signal for re-convergence are necessary, thus complicating the process.

For the initial convergence of the tap coefficients, a blind operation requiring no training signal is desirable. As a literature concerning blind CDMA adaptive interference cancellers is M. L. Honig, U. Madhow, S. Verdu, "Blind Adaptive Interference Suppression for Near-Far Resistant CDMA", Globecom, "94, pp. 379–384. According to this literature, a constraint minimum output power algorithm is used as the tap coefficients updating means for an adaptive filter for interference suppression. In this process, however, the desired signal power versus interference power (SIR) ratio after the convergence is not so satisfactory.

SUMMARY OF THE INVENTION

An object of the present invention is to provide a blind CDMA adaptive interference canceller having a satisfactory convergence performance.

According to an aspect of the present invention, there is provided an interference canceller for CDMA comprising:a code-orthogonalizing filter for despreading a code-multiplexed received signal as an input using orthogonal coefficients, which are independent of channel variations, and are obtained from tap coefficients control means through tap constraint processing with the desired user's chip waveform, and detecting the desired user's signal at a constant power while suppressing interferences; a carrier tracking circuit for effecting carrier phase synchronization of the despread desired user's signal; symbol decision unit for deciding the output of the carrier tracking circuit to be the most possible transmitted symbol; an adder for extracting a symbol decision error signal from the outputs of the symbol decision unit and the carrier tracking circuit; and the tap coefficient control means for adaptively controlling the tap coefficients on the basis of the input to the code-orthogonalizing filter, a recovery carrier outputted from the carrier tracking circuit, the symbol decision error signal, and the desired user's chip waveform.

According to the present invention, there is provided an interference cancelling method for CDMA comprising the steps of: despreading a code-multiplexed received signal as an input using orthogonal coefficients, which are independent of channel variations, and are obtained from tap coefficient control through tap constraint processing with the desired user's chip waveform, and detecting the desired user's signal at a constant power while suppressing interferences; effecting carrier phase synchronization of the despread desired user's signal; deciding the output of the carrier tracking circuit to be the most possible transmitted symbol; extracting a symbol decision error signal from the outputs of the symbol decision unit and the carrier tracking circuit; and adaptively controlling the tap coefficients on the basis of the input to the code-orthogonalizing filter, a recovery carrier outputted from the carrier tracking circuit, the symbol decision error signal, and the desired user's chip waveform.

Other objects and features will be clarified from the following description with reference to attached drawings.

PREFERRED EMBODIMENTS OF THE INVENTION

Figure 1:
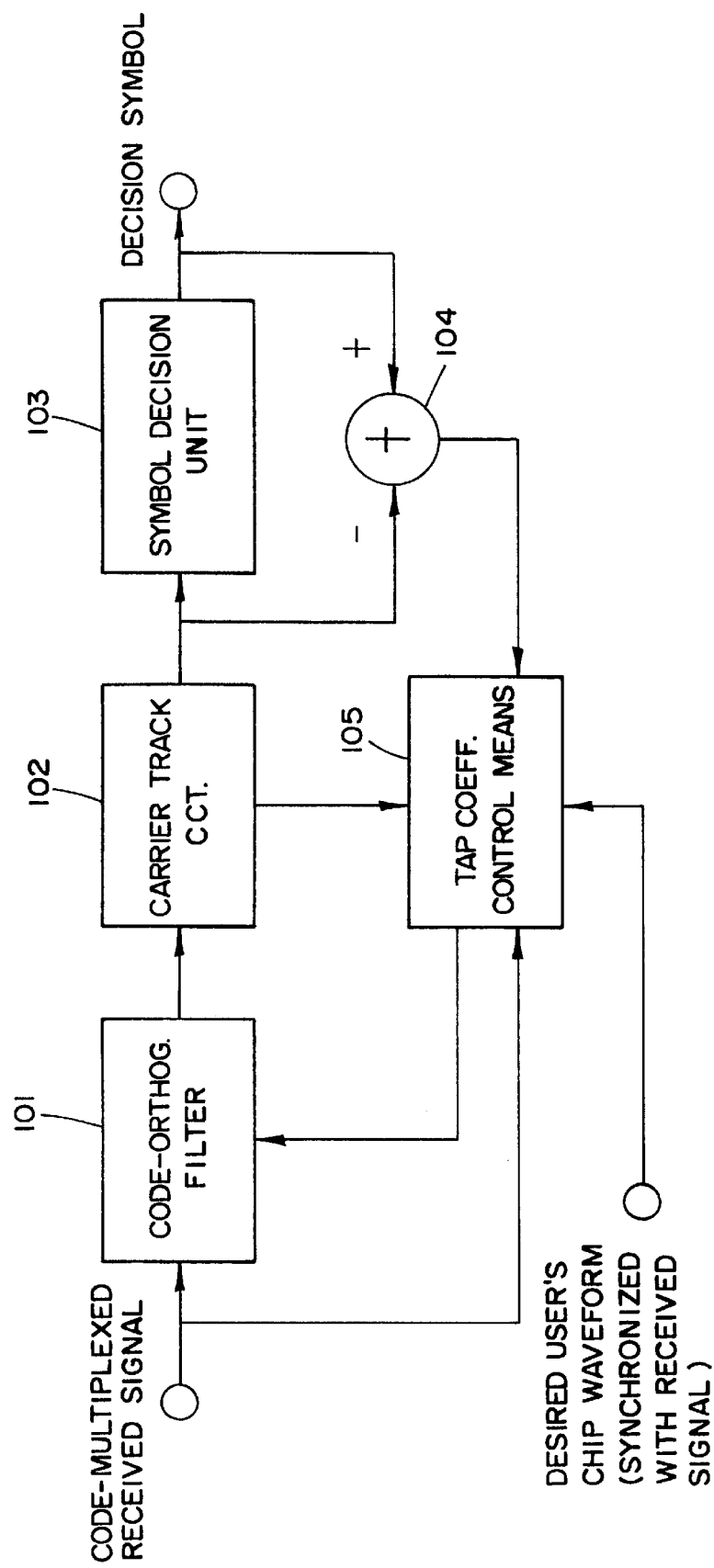
FIG. 1 is a block diagram showing an embodiment of the interference canceller for CDMA according to the present invention.

FIG. 1 is a block diagram showing an embodiment of the CDMA interference canceller according to the present invention.

The embodiment of the CDMA interference canceller comprises an code-orthogonalizing filter 101, a carrier tracking circuit 102, a symbol decision unit 103, an adder 104 and a tap coefficient control means 105.

The code-orthogonalizing filter 101 performs inverse spread using tap coefficients, which has been obtained through a constraint condition process and is independent of transmission line variations, on a code multiplexed received signal as an input with a desired wave spread code waveform, and detects a desired wave of a fixed power level while suppressing interference waves. The carrier tracking circuit 102 effects carrier phase synchronization of the detected desired wave. The symbol decision unit 103 judges the output of the carrier tracking circuit 102 to be the most certain symbol outputted. The adder 104 extracts a symbol judgment error signal from the outputs of the symbol decision unit 103 and the carrier tracking circuit 102. The tap coefficient control means 105 adaptively controls the tap coefficient according to the input to the orthogonalizing filter 101, a reproduced carrier outputted from the carrier tracking circuit 102, the symbol judgment error signal outputted from the carrier tracking circuit 102, and the desired wave spread code waveform.

Figure 2:
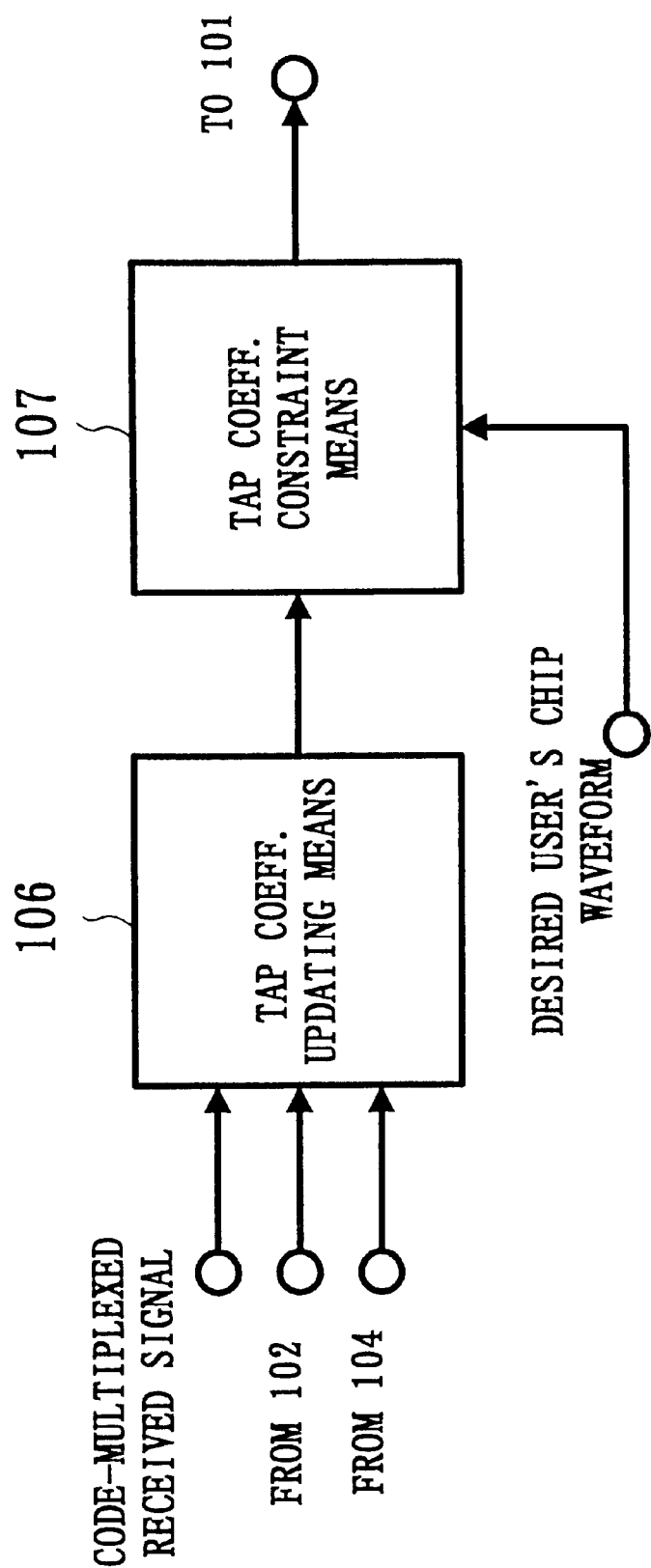
FIG. 2 is a block diagram showing the tap coefficient control means 105 in FIG. 1.
Figure 5:
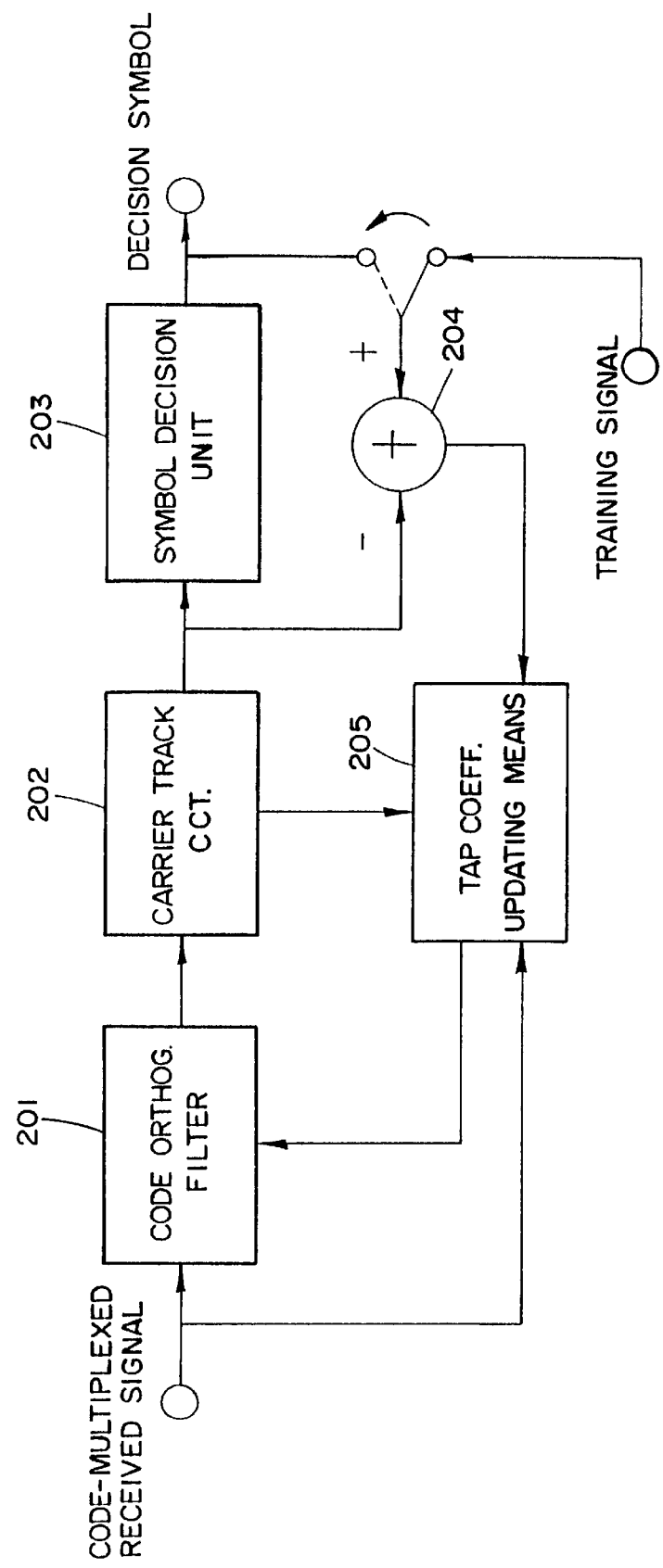
FIG. 5 is a block diagram showing an example of the prior art interference canceller for CDMA.

FIG. 2 is a block diagram showing the tap coefficient control means 105. The tap coefficient control means 105 includes tap coefficient updating means 106 and orthogonalizing coefficient constraint means 107. The tap coefficient updating means 106 determines an tap coefficient through MMSF control with the input to the orthogonalizing filter 101 and a reproduced carrier and a symbol judgment error signal outputted form the carrier tracking circuit 102 as its inputs. The operation of the orthogonalizing coefficient updating means 106 is the same as the operation of the tap coefficient updating means 205 in the prior art CDMA interference canceller shown in FIG. 5.

The tap coefficients constraint processing means 108 performs a constraint processing on the updated top coefficients using a chip waveform of the desired user with a timing synchronized with the received signal. The tap constraint processing is one, which comprises obtaining the projection of the updating coefficients vector on a constraint plane orthogonal to the desired user's chip waveform vector in a code vector space and making the sum of the projected vector and the desired user's chip waveform vector itself. The processing permits holding (keeping) the desired user's signal power constant in the 10 code-orthogonalizing filter output. Representing the updating coefficient vector by c(i+1) and the orthogonal coefficients vector after the constraint processing by c'(i+1), the operation of the tap constraint processing means 107 is expressed as:

$$c'(i+1) = \left(I - \frac{c_0 c_0^T}{c_0^T c_0}\right) c(i+1) + c_0$$

where $c_0$ is the desired user's chip waveform vector used for the constrained processing, and I is a unit matrix.

Figure 4:
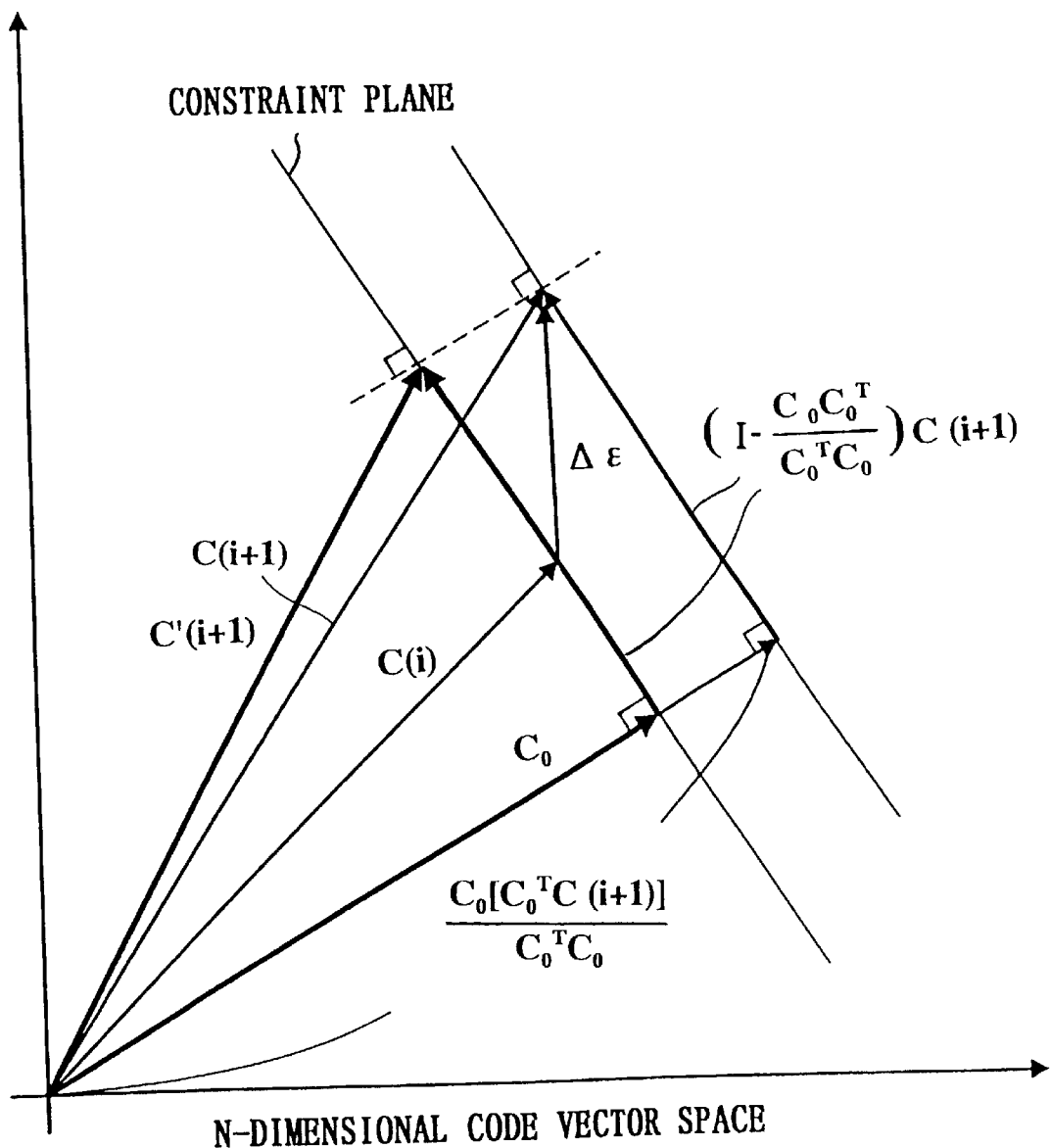
FIG. 4 is a drawing for explaining the operation of the tap coefficient constraint means 107 in FIG. 2.

The operation of the tap coefficients constraint processing means 107 will be further described by using FIG. 4. In the constraint processing, the desired user's signal power at the output of the orthogonalizing filter 101 can be held (kept) constant by limiting (constraint) the range of presence of the orthogonal coefficients vector to a constraint plane orthogonal to $c_0$. Specifically, representing the updating coefficient vector before the constraint condition process by (c(i+1), the orthogonal coefficients vector c'(i+1) after the constraint processing is given as the sum of $c_0$ and the code vector $$\left(I - \frac{c_0 c_0^T}{c_0^T c_0}\right) c(i+1)$$

orthogonal thereto, and the correlation between this orthogonal code and the desired user's signal in the received signal is zero. Thus, the desired user's signal power as the output of the despreading with c'(i+1) is always equal to the desired user's signal power in the case of despreading with $c_0$.

The code vector orthogonal to $c_0$ is obtainable by subtracting a component $$\frac{c_0[c_0^T c(i+1)]}{c_0^T c_0}$$

from c(i+1).

This component is obtainable by taking the correlation between c(i+1) and $c_0$, normalizing the correlation with power of $c_0$ and re-spreading the result with co.

Figure 3:
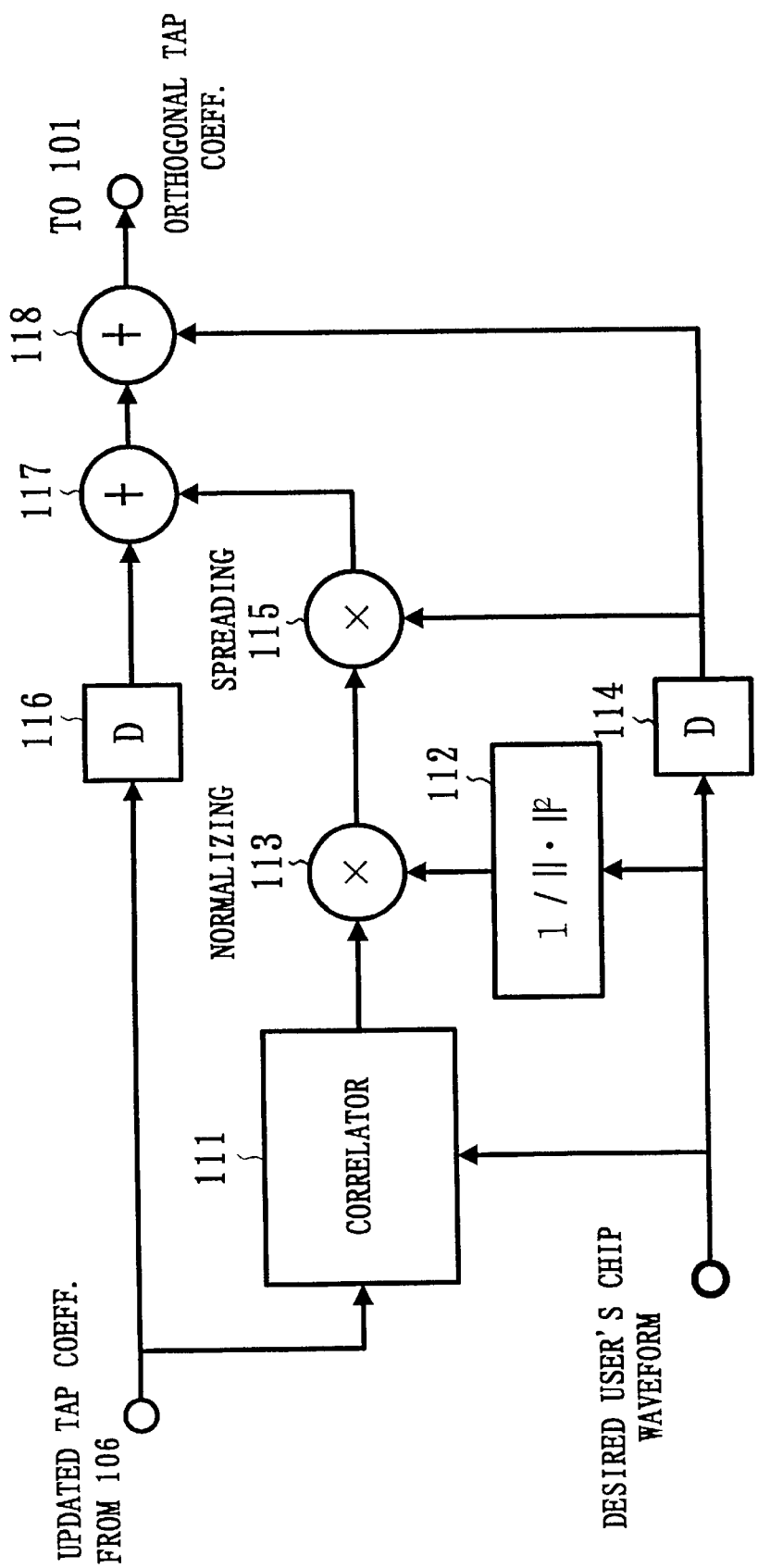
FIG. 3 is a block diagram showing the tap coefficient constraint means 107 in FIG. 2.

The tap constraint processing as described above can be realized with a system as shown in FIG. 3. A correlator 111 detects the correlation between the updated orthogonal coefficients and the desired user's chip waveform. An inverse desired user's chip waveform power calculating means 112 and a multiplier 113 normalize the output of the correlator 111. The normalized output is usually a constant of 1 or more. A delay circuit 114 delays the desired user's chip waveform by the time until the output of the correlator 111 is obtained. The multiplier 115 spreads the normalized output with the desired user's chip waveform. The delay circuit 116 causes a delay of the updated orthogonal coefficients by the time until the output of the correlator 111 is obtained. An adder 117 subtracts the output of the multiplier 115 from the updated orthogonal coefficients. An adder 118 adds the output of the delay circuit 114 to the output of the adder 117.

The inverse desired user's chip waveform power calculating means 112 and multiplier 113 permit multiplification on the desired user's chip waveform itself before the signal reception. Thus this operation need not be carried out every symbol. Denoting the tap number of the orthogonalizing filter 101 by n, the amount of calculations necessary every symbol period in the constraint processing are 2n multiplifications and 3n additions. This amount is not so much compared to the amount in the tap coefficients updating means 106.

According to the present invention, the MMSE control is adopted in the tap coefficients updating means 106. Therefore, in the low SIR condition in the initial stage of the convergence, the carrier phase synchronization is not reliable, and frequent symbol errors occur.

In such a condition, the convergence can be performed in the present invention because the adaptive control, operates as the constraint minimum output power algorithm under the low SIR condition. Since the output power of the orthogonalizing filter 101 is normalized by the desired user's signal power in the constraint processing, the orthogonalizing filter output level is considered to be enough large compared to the decision symbol level, i.e., $$|c^T(i)r(i)| >> |d(i)|$$

In the tap coefficients control, the influence of the recovery carrier x(i) is thus cancelled by approximation as d(i)=0, and the tap coefficients control equation is rewritten as follows, $$c'(i+1) = \left(I - \frac{c_0 c_0^T}{c_0^T c_0}\right)\{c(i) - \text{Re}[\mu r^*(i)c^T(i)r(i)]\} + c_0$$

This shows the tap coefficients control equation of the constraint minimum output power algorithm. In other words, a feature of the present invention resides in that under the low SIR condition in the convergence process, the adaptive control operates as the constraint minimum output power control and is automatically switched over to the MMSE control as the SIR is improved.

The performance of the CDMA interference canceller according to the present invention is influenced by the timing synchronization of the desired user's chip waveform that is separately performed by dedicated code timing searcher. However, stable operation can be expected by the dedicated code timing searcher in such cases as when carrying out the present invention as the RAKE receiver under multipath fading conditions, because the specific path signals can be intentionally combined as well as interference cancellation.

As has been described in the foregoing, according to the present invention it is possible to obtain blind convergence without any training signal and greatly improve the SIR after the convergence by carrying out the tap coefficients constraint processing in the MMSE control to hold (keep) the desired user's signal power constraint in the orthogonalizing filter output. It is thus possible to avoid the transmission efficiency reduction particularly in burst data transmission systems. It is also possible to dispense with control signal exchange between the transmitter and receiver that is required in the case of transmitting training signal. Moreover, in multipath environments, interference-cancelled reception with path diversity can be made by specifying several path signals through the constraint processing, and it is thus possible to expect stable operation.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An interference canceller for CDMA comprising:
   a code-orthogonalizing filter for despreading a code-multiplexed received signal as an input using tap coefficients, which are independent of channel variations, and are obtained from tap coefficients control means through tap constraint processing with a desired user's chip waveform, and detecting a desired user's signal at a constant power while suppressing interferences;
   a carrier tracking circuit for effecting carrier phase synchronization of the despread desired user's signal;
   a symbol decision unit for deciding the output of the carrier tracking circuit to be the most possible transmitted symbol;
   an adder for extracting a symbol decision error signal from the outputs of the symbol decision unit and the carrier tracking circuit; and
   the tap coefficient control means for adaptively controlling the tap coefficients on the basis of the input to the code-orthogonalizing filter, a recovery carrier outputted from the carrier tracking circuit, the symbol decision error signal, and the desired user's chip waveform.

2. The interference canceller for CDMA according to claim 1, wherein the tap coefficient control means includes tap coefficients updating means for performing least minimum squared error control to determine the tap coefficients to minimize the mean power of the symbol decision error signal, and tap coefficients constraint processing means for performing tap coefficient constraint processing on updated tap coefficients outputted from the tap coefficients updating means in a timing synchronized with the desired signal in the code-multiplexed received signal and by using the desired user's chip waveform.

3. The interference canceller for CDMA according to claim 2, wherein the tap coefficients constraint processing means obtains the projection of the updated top coefficients on a constraint plane orthogonal the desired user's chip waveform vector in a code vector space, and calculates the sum of the projected vector and the desired user's chip waveform vector itself as orthogonal coefficients vector.

4. An interference cancelling method for CDMA comprising the step of:

despreading a code-multiplexed received signal as an input using tap coefficients, which are independent of channel variations, and are obtained from tap coefficient control through tap constraint processing with desired user's chip waveform, and detecting a desired user's signal at a constant power while suppressing interferences;

effecting carrier phase synchronization of the despread desired user's signal;

deciding the output of a carrier tracking circuit to be the most possible transmitted symbol;

extracting a symbol decision error signal from the outputs of the symbol decision unit and a carrier tracking circuit; and adaptively controlling the tap coefficients on the basis of the input to the code-orthogonalizing filter, a recovery carrier outputted from the carrier tracking circuit, the symbol decision error signal, and the desired user's chip waveform.

* * * * *